United States Patent
Ahluwalia et al.

(10) Patent No.: US 11,651,170 B2
(45) Date of Patent: May 16, 2023

(54) DEVICE ARCHITECTURE

(71) Applicant: IDEX BIOMETRICS ASA, Oslo (NO)

(72) Inventors: Keith Ahluwalia, Wiltshire (GB); Peter Eckehard Kollig, Hampshire (GB); Anthony Michael Eaton, Hampshire (GB); Tuck Weng Poon, Hampshire (GB); Fred G. Benkley, III, Middleton, MA (US)

(73) Assignee: IDEX Biometrics ASA, Oslo (NO)

( * ) Notice: Subject to any disclaimer, the term of this patent is extended or adjusted under 35 U.S.C. 154(b) by 0 days.

(21) Appl. No.: 17/714,535

(22) Filed: Apr. 6, 2022

(65) Prior Publication Data

US 2022/0230003 A1 Jul. 21, 2022

Related U.S. Application Data

(63) Continuation of application No. 16/965,906, filed as application No. PCT/EP2019/052256 on Jan. 30, (Continued)

(51) Int. Cl.
*G06K 7/10* (2006.01)
*G06K 19/07* (2006.01)
(Continued)

(52) U.S. Cl.
CPC ..... *G06K 7/10158* (2013.01); *G06K 19/0709* (2013.01); *G06K 19/0718* (2013.01); (Continued)

(58) Field of Classification Search
CPC ........... G06K 7/10158; G06K 19/0709; G06K 19/0718; G06K 19/0723; G06K 19/07769; G06K 19/00
(Continued)

(56) References Cited

U.S. PATENT DOCUMENTS 7,364,083 B2 4/2008 Ogawa et al.
7,975,057 B2 7/2011 Guterman et al.
(Continued)

FOREIGN PATENT DOCUMENTS

GB 2508039 5/2014
GB 2531378 4/2016
(Continued)

OTHER PUBLICATIONS

PCT Application No. PCT/EP2019/052256 International Search Report and Written Opinion dated Apr. 9, 2019, 16 pages.
(Continued)

*Primary Examiner* — Edwyn Labaze
(74) *Attorney, Agent, or Firm* — Smith Tempel Blaha LLC; Michael J. Tempel

(57) ABSTRACT

A device for contactless communication with a terminal, the device comprising: an antenna for receiving a wireless signal emitted by the terminal; an embedded chip configured to generate data for communication to the terminal to perform a first function associated with the device; and a module separate from the chip configured to perform processes as part of a second function associated with the device, the module being connected to the antenna and comprising a power-harvesting unit configured to harvest power from the received wireless signal to power at least the module.

20 Claims, 10 Drawing Sheets

Related U.S. Application Data 2019, now Pat. No. 11,341,344, which is a continuation of application No. 15/883,543, filed on Jan. 30, 2018, now Pat. No. 10,664,669.

(51) Int. Cl.
  *G06K 19/077* (2006.01)
  *G06Q 20/20* (2012.01)
(52) U.S. Cl.
  CPC ... *G06K 19/0723* (2013.01); *G06K 19/07769* (2013.01); *G06Q 20/204* (2013.01)
(58) Field of Classification Search
  USPC ............... 235/451, 380, 375, 487, 439, 435
  See application file for complete search history.

(56) References Cited

U.S. PATENT DOCUMENTS

| | | | |
|---|---|---|---|
| 8,172,150 B2 | 5/2012 | Buhr et al. | |
| 8,504,105 B2 | 8/2013 | Baldischweiler et al. | |
| 8,698,594 B2 | 4/2014 | Erhart et al. | |
| 9,460,329 B2 | 10/2016 | Erhart et al. | |
| 9,760,757 B2 | 9/2017 | Erhart et al. | |
| 10,043,053 B2 | 8/2018 | Erhart et al. | |
| 10,679,020 B2 | 6/2020 | Poon et al. | |
| 11,005,302 B1 | 5/2021 | Rule et al. | |
| 2005/0077363 A1 | 4/2005 | Seo | |
| 2006/0145851 A1* | 7/2006 | Posamentier | G06K 19/0723 |
| | | | 340/572.1 |
| 2009/0152954 A1 | 6/2009 | Le et al. | |
| 2013/0207786 A1 | 8/2013 | Hutzler et al. | |
| 2016/0308371 A1 | 10/2016 | Locke et al. | |
| 2016/0321441 A1 | 11/2016 | Tonoyan | |
| 2017/0323166 A1 | 11/2017 | Colussi et al. | |
| 2018/0034319 A1* | 2/2018 | Robert | H02J 50/10 |
| 2018/0253587 A1 | 9/2018 | Lowe | |
| 2018/0283913 A1 | 10/2018 | Chen et al. | |

FOREIGN PATENT DOCUMENTS

| | | |
|---|---|---|
| GB | 2541036 A | 2/2017 |
| WO | 2007022423 A2 | 2/2007 |
| WO | 2008104601 | 9/2008 |
| WO | 2010019961 | 2/2010 |
| WO | 2010051117 | 5/2010 |
| WO | 2017025481 | 2/2017 |

OTHER PUBLICATIONS

European Search Report in App. No. 22154596.5-1205, Apr. 12, 2022.

* cited by examiner

DEVICE ARCHITECTURE

FIELD

This invention relates to an architecture of a multifunction device. In particular, certain aspects relate to the architecture of a device that can operate in a contactless mode of operation.

BACKGROUND

A smart card may refer to a device that includes an embedded integrated circuit chip and internal memory. That internal memory may be located on the integrated circuit chip, or be a separate chip embedded within the card. A smart card may be a contact card; a contactless card, or may be capable of operating as a contact and a contactless card. Smart cards exist in a wide variety of form factors, including plastic cards, key fobs, watches, wearables, electronic passports and USB-based tokens and subscriber identification modules (SIMs) used in mobile phones.

A contact card communicates with a terminal (e.g., a card reader) by physically connecting to the terminal. For example, a contact card may comprise one or more contact pads that provide electrical connectivity to a terminal when the card and terminal are brought into suitable physical contact (e.g. by inserting the card into a slot within the terminal).

A contactless card communicates with a terminal without direct physical contact. Typically, a contactless card communicates with a terminal via radio waves. The contactless card may include an antenna to receive an electromagnetic signal, such as an RF signal, emitted from a terminal. Likewise, data from the card can be communicated back to the terminal by means of the card's antenna.

Some contactless cards are 'passive'. A passive card powers the embedded chip from energy harvested from the signal emitted by the terminal. One way to harvest energy from the emitted signal is to arrange the antenna as a coil that induces a voltage across its terminals by means of induction when receiving the emitted signal.

Smart card technology is being implemented within a variety of devices used to perform increasingly varied functions, for example to perform payments, grant a user physical access to a region of an environment, to store personal identification information of the user; identify or authenticate a user etc. In some cases, it may be desirable for a device to be capable of performing multiple different functions.

There are several difficulties faced when trying to implement multiple functionalities into a device using smart card technology, particularly when a device designed to perform a 'base' or primary function is adapted to perform additional functions. One problem is that industry standards governing smart card technology were originally designed for payment/authentication cards. Existing infrastructure has therefore been designed in compliance with these standards that is suitable for powering this primary function of facilitating payments or transactions, which may place constraints on the power that can be consumed by any additional functionality placed onto the card. This problem may be compounded by the fact the additional functions may consume more power and/or require power for a longer period of time than the primary function of the card. A further problem is that for cards operating in a contactless mode, the power drawn by the additional functionality may affect the load modulation of the signal emitted by the terminal, which may appear as extra noise to the terminal.

SUMMARY

According to the present invention there is provided a device for contactless communication with a terminal, the device comprising:
  an antenna for receiving a wireless signal emitted by the terminal;
  an embedded chip configured to generate data for communication to the terminal to perform a first function associated with the device; and
  a module separate from the chip configured to perform processes as part of a second function associated with the device, the module being connected to the antenna and comprising a power-harvesting unit configured to harvest power from the received wireless signal to power at least the module.

The module may be connected by a link to the chip, the module comprising a power management unit configured to control transmission of harvested power to power the chip.

The module may be configured to manage the transmission and reception of messages with the reader containing data generated by the chip.

The chip may be connected to the antenna and comprise a power-harvesting unit configured to harvest power from the received wireless signal to power the chip.

The module may be configured to harvest power from the received wireless signal independently of the chip.

The module and chip may each comprise a dedicated microcontroller unit (MCU).

The device may be configured so that only the chip is arranged to manage transmission and reception of messages with the terminal.

The device may be configured so that only the chip is adapted to communicate messages with the terminal via the antenna.

The chip may comprise a modem configured to extract data from the received wireless signal emitted from the terminal.

The modem may further be configured to modulate data generated by the chip onto the signal emitted by the terminal to communicate the data to the terminal.

The device may be for contact and contactless communication with the terminal, and may further comprise:
  at least one contact element connected to the embedded chip and the module and arranged to supply power to the embedded chip and the module from the terminal when the device is in contact communication with the terminal.

The module may further comprise noise mitigation circuitry configured to use power harvested from the received wireless signal as the device is brought into range of the terminal to store charge.

The noise mitigation circuitry may be configured to supply current demanded from one or more components of the module to inhibit current being drawn from the antenna during operation of those components.

The noise mitigation circuitry may be located within the power harvesting unit.

The noise mitigation circuitry may comprise one or more charging elements for storing charge, the charging elements being arranged to discharge to supply demanded current.

The noise mitigation circuitry may comprise a rectifier circuit coupled to the antenna and configured to output a rectified voltage to charge a first charging element.

The noise mitigation circuitry may further comprise supply regulation circuitry configured to output a regulated voltage to charge a second charging element.

The noise mitigation circuit may further comprise a control block configured to control the amount of current supplied to the one or more components from the charging elements in dependence on deviations of demanded current from those components.

The noise mitigation circuitry may comprise a first voltage regulator coupled to the rectifier circuit and a first component of the module, and a second voltage regulator coupled to the rectifier circuit and a second component of the module, the first voltage regulator being configured to output a different regulated voltage level than the second voltage regulator.

The first component of the module may be an ASIC configured to control a sensor forming part of the module, and the second component of the module may be a microcontroller unit.

The first voltage regulator may be configured to output a higher regulated voltage than the second voltage regulator.

The first voltage regulator may be a low-dropout regulator, and the second voltage regulator may be a switch-mode-power supply.

The noise mitigation circuitry may be located locally at a component of the module.

The chip may be a secure element. The chip may be a first integrated circuit chip, and the module may be implemented on a second integrated circuit chip.

The module may be a biometric sensor module.

The device may be configured to communicate with the terminal in accordance with the ISO14443 and/or the ISO7816 standard.

The first function may be one of: ID verification; physical access control; a financial transaction; personal information retrieval; health record retrieval.

The second function may be a biometric authentication of a user.

The device may be a contactless card and the terminal may be a point of sale terminal.

There is also provided a device for communicating with a terminal in a contact or contactless mode of operation, the device comprising:
- an antenna for receiving a wireless signal emitted by a terminal;
- an embedded chip configured to generate data for communication to the terminal to perform a first function associated with the device;
- a biometric sensor module separate from the chip and configured to perform processes forming part of a biometric sensing of a user feature, the module being connected to the antenna and comprising a power-harvesting unit configured to harvest power from the received wireless signal to power one or more internal components of the module when the device operates in the contactless mode of operation; and
- one or more contact elements configured to supply power to the biometric sensor module from a terminal when the device operates in the contact mode of operation;
wherein the biometric sensor module further comprises a power conditioning circuit coupled to the one or more contact elements; the power-harvesting unit and at least one of the internal components of the module; the power conditioning circuit comprising:
- a circuit path coupled at a first end to the one or more contact elements and at a second end to the power harvest unit and said at least one internal component of the module;
- a switching element interconnecting a first part of the circuit path comprising the first end and a second part of the circuit path comprising the second end;
- a bypass circuit providing a path that bypasses the switching element, the bypass circuit permitting current to flow in a direction from the first end to the second end of the circuit; and
- a coupling unit coupled to the first part of the circuit path and the switching element;
- the circuit being arranged so that: when the card is operating in contact mode, power supplied through the contact elements drives the switching element via the coupling unit to an open configuration thereby limiting current to flow from the first end to the second end of the circuit through the bypass circuit; and when the card is operating in contactless mode, power harvested by the power-harvesting unit causes the switching element to adopt an open configuration thereby preventing current flow from the second end of the circuit to the first end of the circuit.

The bypass circuit may comprise a diode that limits current flow to the direction from the first part of the circuit to the second part of the circuit. The bypass circuit may further comprise one or more resistor elements arranged in series with the diode.

The power-conditioning circuit may contain only a single switching element. The switching element may be a bi-polar transistor. The switching element may be a PNP-transistor. The emitter of the transistor may be electrically connected to the first part of the circuit path, and the collector may be electrically connected to the second part of the circuit path.

The power conditioning circuit may further comprise a low-pass filter. The bypass circuit may form part of the low-pass filter thereby limiting current to flow from the first end to the second end of the circuit through the low-pass filter when the card is in contact communication with the terminal and the switching element is in an open configuration.

The coupling unit may be a capacitor. The at least one internal component of the module may be a power management unit.

BRIEF DESCRIPTION OF FIGURES

The present invention will now be described by way of example with reference to the accompanying drawings. In the drawings.

DETAILED DESCRIPTION

Figure 1:
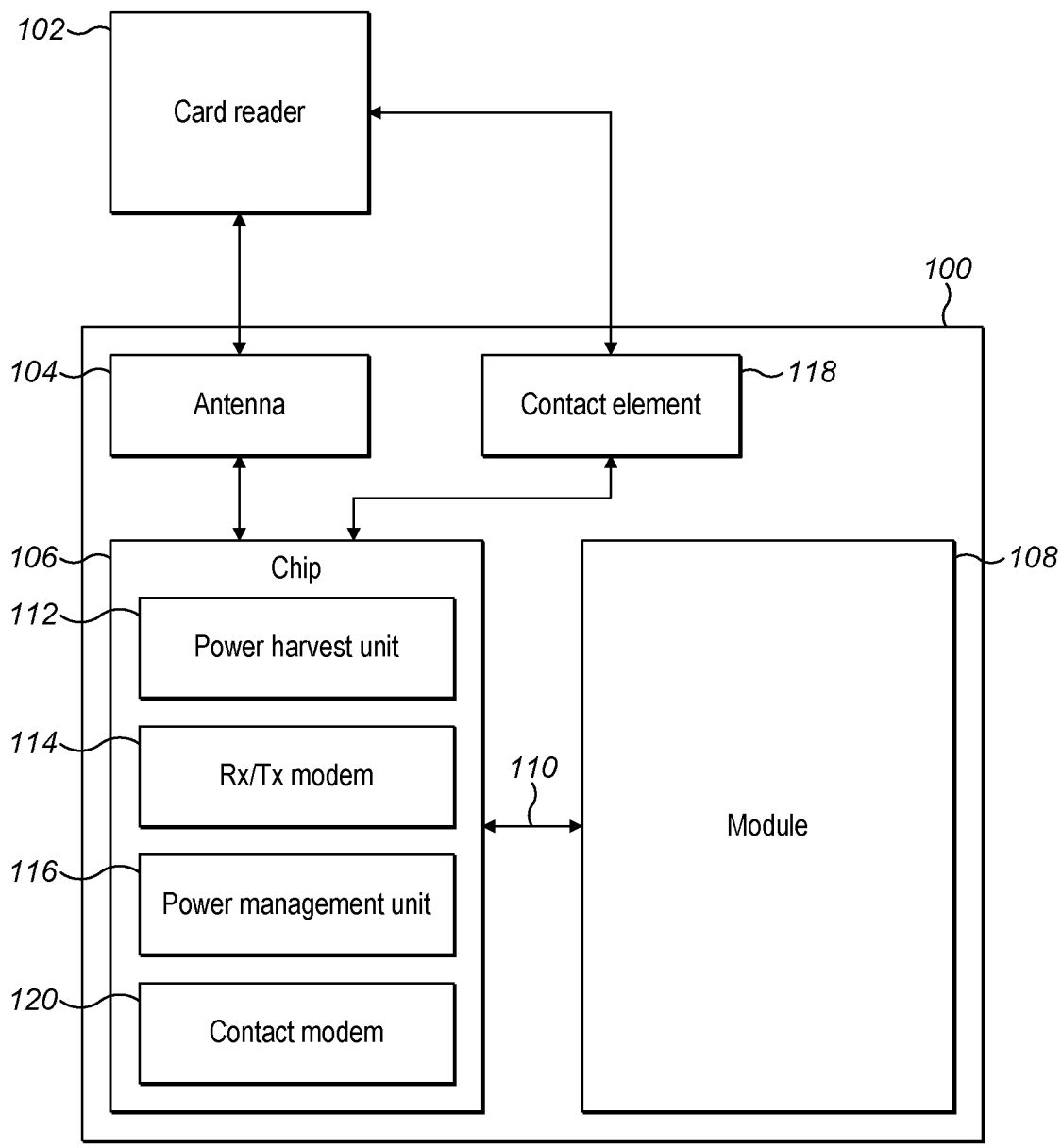
FIG. 1 shows a first example of a card architecture.

The present disclosure is directed to a device for contactless or contact communication with a terminal. The device comprises an antenna for receiving a wireless signal emitted by the terminal; an embedded chip (e.g. an integrated circuit chip) and an additional embedded module. The module is separate from the chip (logically and/or physically); for example they may be distinct components each embedded within the device. The chip generates data for communication to the terminal to perform a first function associated with the device. This first function may be a base, or primary function of the device. The chip could be, for example, a secure element. The module is configured to perform processes as part of a second function associated with the device. Thus, the device is a multi-function device. The second function may be implemented by both the chip and the module; that is, the processes required to perform the second function may be distributed across both the chip and the module. Alternatively, the processes required to perform the second function may all be performed by the module; i.e. the module may perform the second function.

The device may be a smart card, and the terminal a card reader. In one particular implementation, the device is a smart card, such as bank or credit card, and the primary function is the performance of a financial transaction, such as making a purchase. The second function may be a type of biometric authentication. The biometric authentication may authenticate a user of the device to enable the completion of the first function (e.g. performing a financial transaction). Alternatively, the second function may be the capture of an image of part of a user (e.g., for the purposes of biometric authentication). Other example implementations will be described in more detail below. The module is connected to the antenna and comprises a power harvesting unit configured to harvest power from the wireless signal received by the antenna from the terminal. This harvested power is used to power at least the module within the device. In some examples, the power harvested by the module is used to power both the module and the embedded chip. In other examples, the antenna is shared by both the embedded chip and the module, with each of the chip and module including a respective power-harvesting unit to harvest power from the wireless signal received by the antenna from the terminal.

Various internal architectures of multi-function devices will now be described with reference to FIGS. 1 to 10. In each of these examples, the device is in the form of a smart card, and the terminal with which it communicates is in the form of a card reader. This is for the purpose of illustration only, and it will be understood that each of the following examples could be implemented in any suitable device capable of performing contactless and/or contact communication with a terminal. The following examples could for example be implemented within a device adopting a form factor that is not a card, for example a fob, a dongle or a security token (e.g. a USB token). Alternatively, the following examples could be implemented within devices integrated into a communication device such as a mobile phone or smartphone; a wearable device, such as a bracelet, watch, a glove/pair of gloves, a pin (e.g. a brooch), a badge or some other contactless wearable device.

Each of these figures illustrates a card that can communicate with the terminal by both physical contact (by operating in a contact mode of operation), and without direct physical contact (by operating in a contactless mode of operation). These cards are referred to as dual-interface cards because they have a physical contact interface (e.g. in the form of a contact element) and a contactless interface (e.g. in the form of a contactless front end). The cards may be configured to communicate with the terminals according to any suitable radio communication standard when operating in contactless mode, for example Near Field Communication (NFC). In each figure, the card comprises an embedded chip to perform a first function associated with the card, and a separate module that operates to perform processes as part of a second function associated with the card. The second function may be performed entirely by the module, or both the chip and module may perform parts of the processing to perform the second function.

The architectures illustrated in these figures could be implemented within cards incorporating a variety of different functions. For example, the chip could implement banking functionality. Alternatively, the chip may operate to provide some other function associated with the card requiring communication with a terminal, for example: providing physical access of the card user to a region of an environment (e.g. building access); identifying or authenticating a user; retrieval of personal user information (e.g. medical information and records) etc. The chip may be configured to communicate with the card reader in accordance with the ISO14443 standard (when operating in contactless mode) and the ISO7816 standard, as well as the EMVCo® standard. The module may provide some other function associated with the card that does not require communication with a card reader. For example, the module may be a biometric sensor module including one or more biometric sensors. The biometric sensor module may operate to perform biometric recognition or authentication of one or more biometric parameters including, for example: fingerprint recognition; iris recognition; vein recognition; retina recognition; voice recognition; behavioural recognition; facial recognition, etc. Alternatively, the module may be a PIN, or password generator, a movement or a position sensor, a display screen, a status indicator or a data input mechanism such as a keyboard.

FIG. 1 shows an example card 100 with a first type of internal architecture. The card comprises an antenna 104, a chip 106, a module 108 and a contact element 118. In general, the card may comprise one or more contact elements; a single contact element is shown here for clarity.

The chip is embedded within the card and could be, for example, a secure element. Module 108 may also be embedded within the card. The module is a physically and/or logically distinct component from the chip 106. Each of the chip 106 and module 108 may for example be implemented on respective integrated circuit chips embedded in the card. The module 108 and chip 106 are connected to each other by a link 110, such as a bus.

The contact element 118 is connected to the chip 106. The chip may be connected to the contact element by a conductive link. The contact element enables the card to communicate with the card reader through direct physical contact. The contact element provides electrical connectivity to the card reader when the card and reader and brought into suitable physical contact. Thus, when the card is operating in contact mode, the chip receives power from the card reader through the contact elements. The card may communicate with the card reader in accordance with the ISO7816 standard when operating in contact mode.

The chip comprises a contact modem 120 that manages the transmission of messages to and reception of messages from the card reader when operating in contact mode. The contact modem 120 may also ensure the communications between the chip and card reader satisfy any relevant standards (e.g. the ISO7816 standard) when the card operates in contact mode.

The antenna 104 is connected to the chip 106. The antenna is not connected to the module 108. The chip comprises a power harvest unit 112 that harvests power from the signal emitted from the card reader received by the antenna 104 when the card is operating in contactless mode. The power-harvest unit 112 may for example induce a voltage from the received signal. That induced voltage can be supplied to other components of the chip 106, and module 108. The chip further comprises a receiver/transmitter (Rx/Tx) modem 114 that manages the transmission of messages to and reception of messages from the card reader when in contactless mode. If communications between the card 100 and card reader 102 are governed by one or more standards, the transceiver modem 114 may operate to manage the reception and transmission of those messages to comply with the standards.

In the architecture shown in FIG. 1, only the chip 106 is connected to the antenna 104, and consequently only the chip 106 harvests power from signals received from the card reader. The power up, subsequent power consumption of the module 108 during operation and power down is therefore controlled by the chip 106. The transmission of harvested power to the module 108 may be controlled by the power management unit 116 of chip 106.

It has been appreciated that a problem with the architecture shown in FIG. 1 is that the module 108 is not readily capable of controlling or managing the amount of power it receives, because this is controlled by the chip 106 independently of the module. However, in order to be able to manage power to the module efficiently, it may be desirable to have detailed knowledge of: (i) the timing and power requirements of the module; (ii) the phase, or stage of processing at the module; and (iii) knowledge of available power within the field emitted by the card reader. It is therefore likely to be challenging to implement effective power management of the module from the chip, particularly if the module and chip are supplied from different providers. A further problem with the architecture shown in FIG. 1 is that it may require modification of the chip to make power available to the module. Such modifications to the chip may be both expensive and time consuming, particularly if the chip is configured to comply with industry regulations and standards with strict security requirements (such as ISO ISO14443, ISO7816, and the EMVCo® standard).

Figure 2:
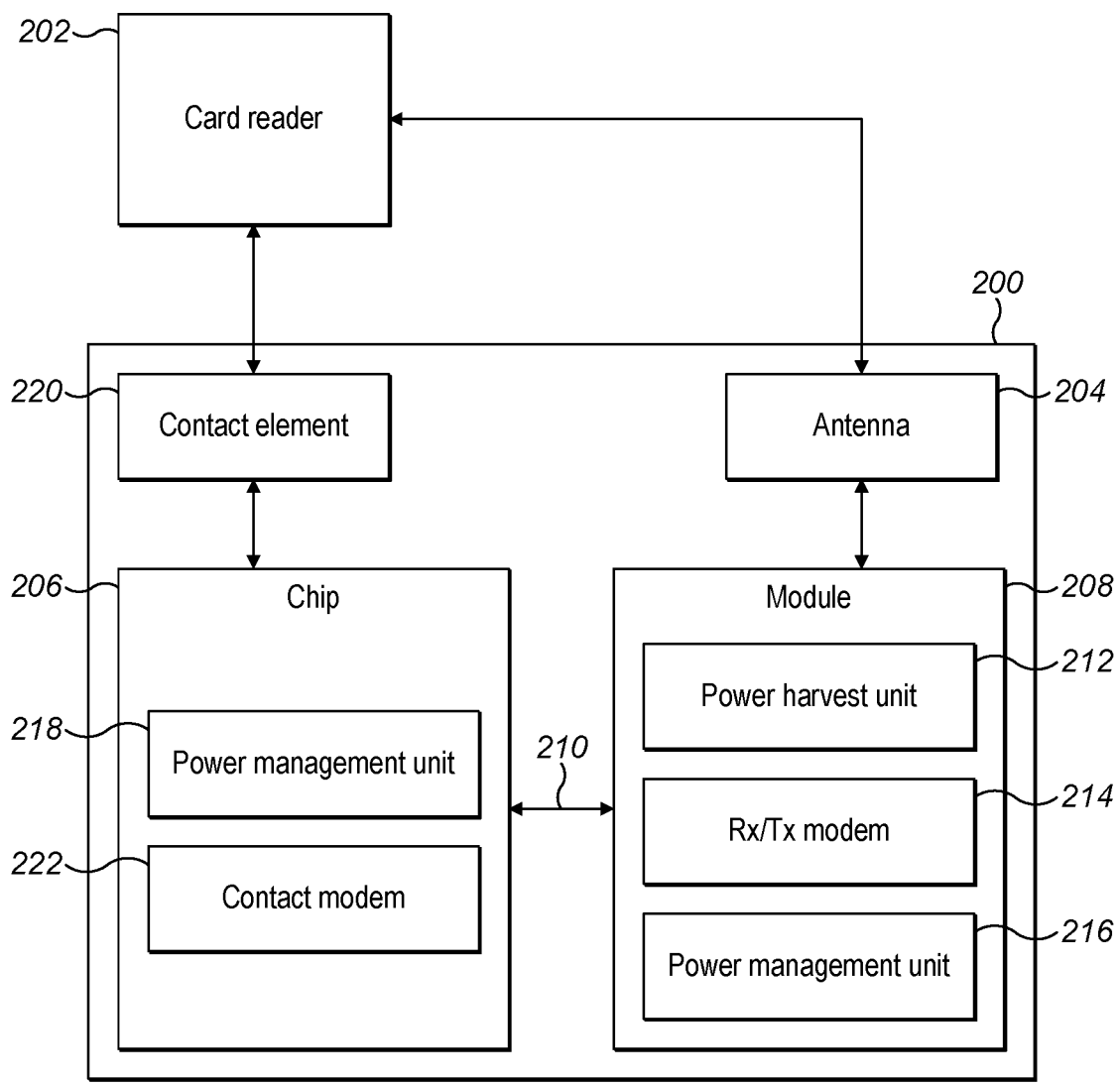
FIG. 2 shows a second example of a card architecture in which a module is connected to the card antenna.

FIG. 2 illustrates an alternative architecture within a multi-function card.

Card 200 comprises an antenna 204, embedded chip 206, a module 208 and a contact element 220. Module 208 may be embedded within the body of the card 200. Module 208 is again a distinct component to the chip 206 (i.e. the module is logically and/or physically separate from the chip). Module 208 may for example be implemented within an integrated circuit chip separate to the chip 206. Module 208 and chip 206 are connected to each other by a link 210. Link 210 could be a bus, for example.

The contact element 220 is connected to the chip 206. The chip may be connected to the contact element by a conductive link. The contact element enables the card to communicate with the card reader 202 through direct physical contact. The contact element provides electrical connectivity to the card reader when the card and reader and brought into suitable physical contact. Thus, when the card is operating in contact mode, the chip receives power from the card reader through the contact elements. The card may communicate with the card reader in accordance with the ISO7816 standard when operating in contact mode. Power supplied from the reader in contact mode may be supplied to the module 208 to power its internal components. The supply of power to the module from the chip in contact mode may be controlled by a power management unit 218 within the chip.

The chip may comprise a contact modem 222 that manages the transmission of messages to and reception of messages from the card reader when operating in contact mode. The contact modem 222 may also ensure the communications between the chip and card reader satisfy any relevant standards (e.g. the ISO7816 standard) when the card operates in contact mode.

When operating in contactless mode, the card 200 communicates with the card reader 202 (e.g. transmits messages to and/or receives messages from the card reader) through the antenna 204.

In the architecture shown in FIG. 2, only module 208 is connected to antenna 204; chip 206 is not connected to the antenna. Module 208 comprises a power-harvest unit 212 configured to harvest power from the signal received by the antenna 204 from the reader 202 when operating in contactless mode. In contrast to the architecture illustrated in FIG. 1, chip 206 does not include a power harvest unit because chip 206 is not connected to the antenna 204, and thus cannot harvest power from the received signal. Power harvested by the power harvest unit 212 may be supplied to other components of the module 208. Power harvested by the power harvest unit 212 may also be supplied to the chip 206. The module 208 may supply power to the chip 206 to enable the chip to perform its functions. This power may be supplied by link 210 or by a further link (not shown). The transmission of harvested power to the chip 206 may be controlled by power management unit 216 of the module 208.

Because only module 208 is connected to the antenna 204, communications with the card reader 202 are performed by the module 208 when the card operates in contactless mode. That is, the module 208 controls and manages the transmission of messages to, and the reception of messages from, the card reader 202 in contactless mode. The control of messages to and from the card reader 202 is performed by the Rx/Tx modem 214 within module 208. As described above, communications between the card 200 and card reader 202 may be governed by one or more standards. In such circumstances, the transceiver modem 214 may control the exchange of messages with the card reader to comply with those one or more standards. The standards may specify, for example, time windows for the transmission and/or reception of messages; formats for the messages; or anti-collision and/or transmission protocols.

Data to be included in messages transmitted to the card reader 202 in contactless mode may be generated by the chip 206 during its operation. Similarly, data included within messages received by the module 208 may be routed to the chip 206 (e.g. by link 210). In other words, the chip 206 and card reader 202 may communicate or exchange messages via the module 208 in contactless mode. Though the transceiver modem 214 that manages communications with the card reader is located within the module 208, the module 208 itself may not generate data or messages that are communicated to the card reader 202. That is, only chip 206 may generate data that is communicated to the card reader. In this regard, the chip 206 may be referred to as a communication master, because it is the only component of the card in communication with the card reader (i.e. the only component that processes received messages from the reader 202 and/or generates message content for transmission to the reader). In some examples, the messages communicated to the card reader 202 containing data may also only be generated by the chip 206. The module 208 (e.g., the transceiver modem 214 within the module) then operates to modulate the messages onto the signal emitted by the card reader to communicate those messages to the card reader.

Figure 3:
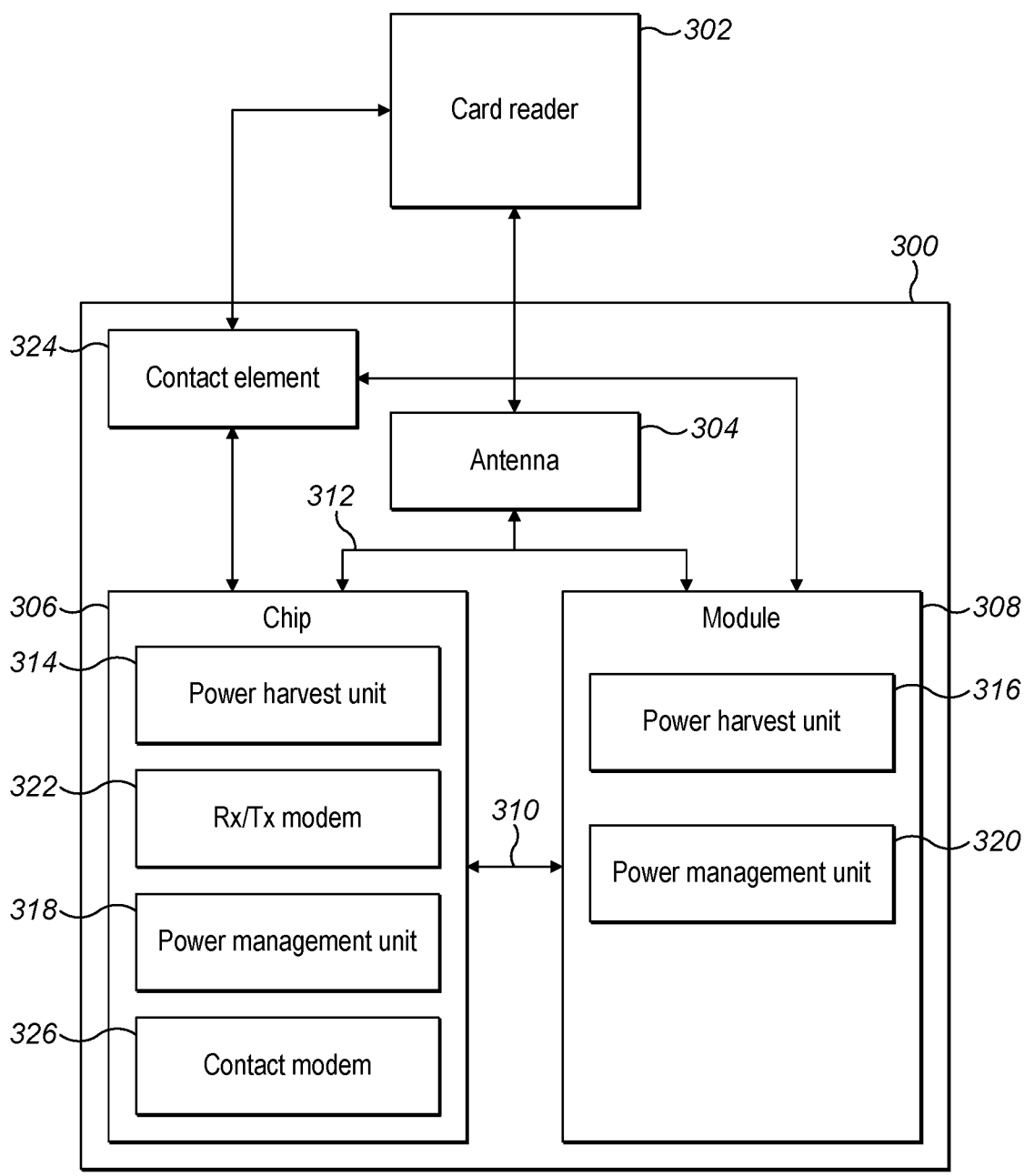
FIG. 3 shows a third example of a card architecture in which a module and embedded chip are connected to the card antenna.

A further example architecture is illustrated in FIG. 3.

FIG. 3 shows a card 300. Card 300 comprises antenna 304, embedded chip 306, a module 308 and a contact element 324. Module 308 is logically and/or physically separate to the chip 306. In the example shown, the module is a distinct component to the chip 306 connected by link 310, which may be a bus, for example. Module 308 may be implemented within an integrated circuit chip (ICC) separate to the chip 306. In other examples, the module and chip may be integrated on a single ICC, yet be logically separate. Card 300 communicates with the card reader 302 (e.g. transmits messages to and/or receives messages from the card reader) through the antenna 304 when operating in contactless mode, and through the contact element 324 when operating in contact mode. In general, the card may comprise one or more contact elements; one contact element is shown here for the purpose of clarity.

The contact element 324 is connected to the chip 306 and the module 308, e.g. by conductive links. The contact element enables the card to communicate with the card reader through direct physical contact. The contact element provides electrical connectivity to the card reader when the card and reader and brought into suitable physical contact. Thus, when the card is operating in contact mode, the chip 306 and module 308 receive power from the card reader through the contact elements. Power supplied from the reader in contact mode may be supplied to the module and chip to power their internal components.

The antenna 304 is connected to both the chip 306 and the module 308. The antenna is shown connected to the chip 306 and the module 308 by power line 312 that is routed from the antenna to both the chip and the module. Power line 312 may be a physical line, e.g. a conductive element.

Chip 306 includes a power harvest unit 314. The power harvest unit is operable to harvest power from the signal received by the antenna 304 when the card operates in contactless mode. Power harvested by unit 314 may be supplied to other components of the chip 306 to power those components.

Chip 306 further includes a power management unit (PMU) 318. The PMU 318 operates to manage, or control, the use of power (either harvested by the power harvest unit 314 in contactless mode or supplied through the contact element 324 in contact mode) by components of the chip. The PMU 318 may control the power consumed by the other components of the chip to perform their tasks.

The module 308 includes its own power harvest unit 316. The power harvest unit 316 is operable to harvest power from the signal received by the antenna 304 in contactless mode. Power harvested by unit 316 may be supplied to other components of the module 308 to power those components. The presence of power harvest unit 316 within the module 308 enables the module to harvest power from signals received from the reader 302 separately from the chip 306.

Module 308 also includes its own power management unit 320 to manage, or control, the consumption of power (either harvested by the power harvest unit 316 in contactless mode or supplied through the contact element 324 in contact mode) by components of the module. The PMU 320 may control the power consumed by the other components of the module 308 during their operation to perform their tasks.

Because the contact element 324 is connected to both the chip 306 and the module 308, and the antenna 304 is also connected to both the chip 306 and module 308, the chip and module can both receive or harvest power from the reader separately of each other. However, only the chip 306 is capable of communicating with the reader. That is, only the chip 306 can generate and transmit messages to the reader (e.g., by load modulating the signal emitted by the reader). Likewise, the chip 306 is the only component on the card 300 that can receive and process messages communicated from the reader (e.g. by demodulating the signal received by the antenna). In other words, only chip 306 generates data that is communicated to the reader 302. Thus, while in some examples the module 308 may generate and communicate data to the chip 306, the module 308 does not communicate (either directly or indirectly) with the reader 302. Put another way, data generated by the module 308 may remain locally on the card 300.

The control of messages to and from the card reader 302 (and more specifically, between the chip 306 and reader 302) is performed by the Rx/Tx transceiver modem 322 and contact modem 326 within the chip 306. The transceiver modem 322 controls the communication of messages with the reader 302 in contactless mode, and the contact modem 326 controls the communication of messages with the reader 302 in contact mode.

The transceiver modem 322 may for example control the exchange of messages with the card reader 302 to comply with one or more standards governing the communication between card 300 and reader 302 (e.g. the ISO14443, ISO7816 and EMVCo® standards). The standards may specify, for example, time windows for the transmission and/or reception of messages; formats for the messages; or anti-collision and/or transmission protocols. The transceiver modem 322 may also be responsible for load modulating messages generated by the chip 306 onto the signal emitted by the reader 302 to communicate those messages to the reader, and demodulating the signal received by the antenna 304 to decode messages received from the reader.

The contact modem 326 may similarly control the exchange of messages with the card reader 302 to comply with the standards governing communications between the card and reader in contact mode (e.g. the ISO7816 and EMVCo® standards).

The architecture illustrated in FIG. 3 may conveniently present several advantages over the architecture illustrated in FIG. 1.

Firstly, because the antenna 304 is shared by both the chip 306 and the module 308, and both chip 306 and module 308 include respective power harvesting units, the module 308 can harvest power from the received signal independently of the chip 306 in contactless mode, e.g. independently of the operation of the chip. Furthermore, because the chip 306 and module 308 include respective power management units, the module 308 and chip 306 can control and manage the power consumption of respective internal components independently of each other. This can enable greater control of the processing tasks and functions carried out by various components of the chip and module, which can be particularly advantageous in implementations when the power harvested from the card varies over the typical time required to perform those tasks and functions (e.g. due to variations in the physical position of the card in space); and/or when the communications between the card and reader are tightly regulated, for example when the card communicates with the reader to perform banking functions, in which case communications must satisfy, amongst others, the EMVCo® standard. The independent control and management of power consumption of the chip 306 and module 308 also enables the both the chip and module (or substituent components thereof) to be powered down, or put in a low-power mode when they are not needed, leading to greater power savings compared to what can be achieved with the architectures shown in FIGS. 1 and 2, where such independent control is not possible.

Secondly, enabling both the chip 306 and the module 308 to access and harvest power from the antenna independently of each other reduces the complexity of controlling the power management of the two components. As described above, effective power management of the module 308 may require knowledge of parameters including the timing and power requirements of the module, knowledge of the available power that can be harvested from the signal emitted from the card reader, and knowledge of the various phases, or stages, of the module's processing. That is, effective power management of the module 308 may require local knowledge of the module and its operation. Enabling the module 308 to manage its power separately of the chip 306 therefore simplifies the implementation of an effective power management strategy of the module.

Thirdly, connecting the module 308 to the antenna 304 enables the module to harvest power from the received signal without requiring input or control from the chip 306, meaning the fundamental operation of the chip can remain unchanged compared to the situation in which the module 308 is not present on the card. This is convenient because in certain implementations where the communication between the chip and reader is tightly regulated, modification to the connections or operation of the chip (e.g. by enabling access to the chip from further components) may be restricted, or technically complex to implement. Adopting the architecture illustrated in FIG. 3 can enable a card containing a chip implementing a base, or primary function to be more readily adapted to contain an additional module implementing a secondary, or additional function because substantial modification to the chip can be avoided.

The architecture illustrated in FIG. 3 may also provide advantages over the architecture illustrated in FIG. 2.

The architecture illustrated in FIG. 3 enables the Rx/Tx modem to remain within the chip 306. This is particularly convenient because including the Rx/Tx modem within the module (as in card 200) may present several challenges. For example:

(i) including the Rx/Tx modem within the module may enable the module to manipulate communications between the card and card reader, or introduce disturbances to otherwise manipulate the outcome of the primary function of the card, giving rise to security concerns. Thus, when the card and card reader are configured to comply with communication protocols having relatively strict security requirements (such as EMVCo®), implementing the Rx/Tx modem within the external module would likely impose additional security requirements on the module than may otherwise be required.

(ii) Communications between the chip and card reader would require messages to be sent over link 210, which may consume additional power, bandwidth and introduce additional latency.

(iii) The Rx/Tx modem is a relatively complex component that may require specialist knowledge for effective implementation (particularly when compliance with the ISO14443, ISO7816, and the EMVCo® standards is desired). The inclusion of the Rx/Tx modem within the module therefore increases its complexity, which may have practical implications when the chip and module are supplied by different providers.

The architecture of FIG. 3 is also more readily compatible with the contact mode of operation compared to the architecture shown in FIG. 2. In the architecture shown in FIG. 2, the modem for contact mode communications is located within the chip 206, whereas the modem for contactless mode communications is located within the module 208. A consequence of this is that the communication path for messages exchanged between the card and card reader is different for the two modes of operation, which may for example lead to more complex routing strategies. In contrast, in the architecture shown in FIG. 3, both the transceiver modem 322 and the contact modem 326 are located within the chip 306, which means the communication path for messages exchanged with the card reader is the same for both the contact mode and the contactless mode.

It will be appreciated that the cards illustrated in FIGS. 1-3 may include additional components not shown in the figures. For example, both the chip and the module may include dedicated microcontroller units (MCUs).

Figure 4:
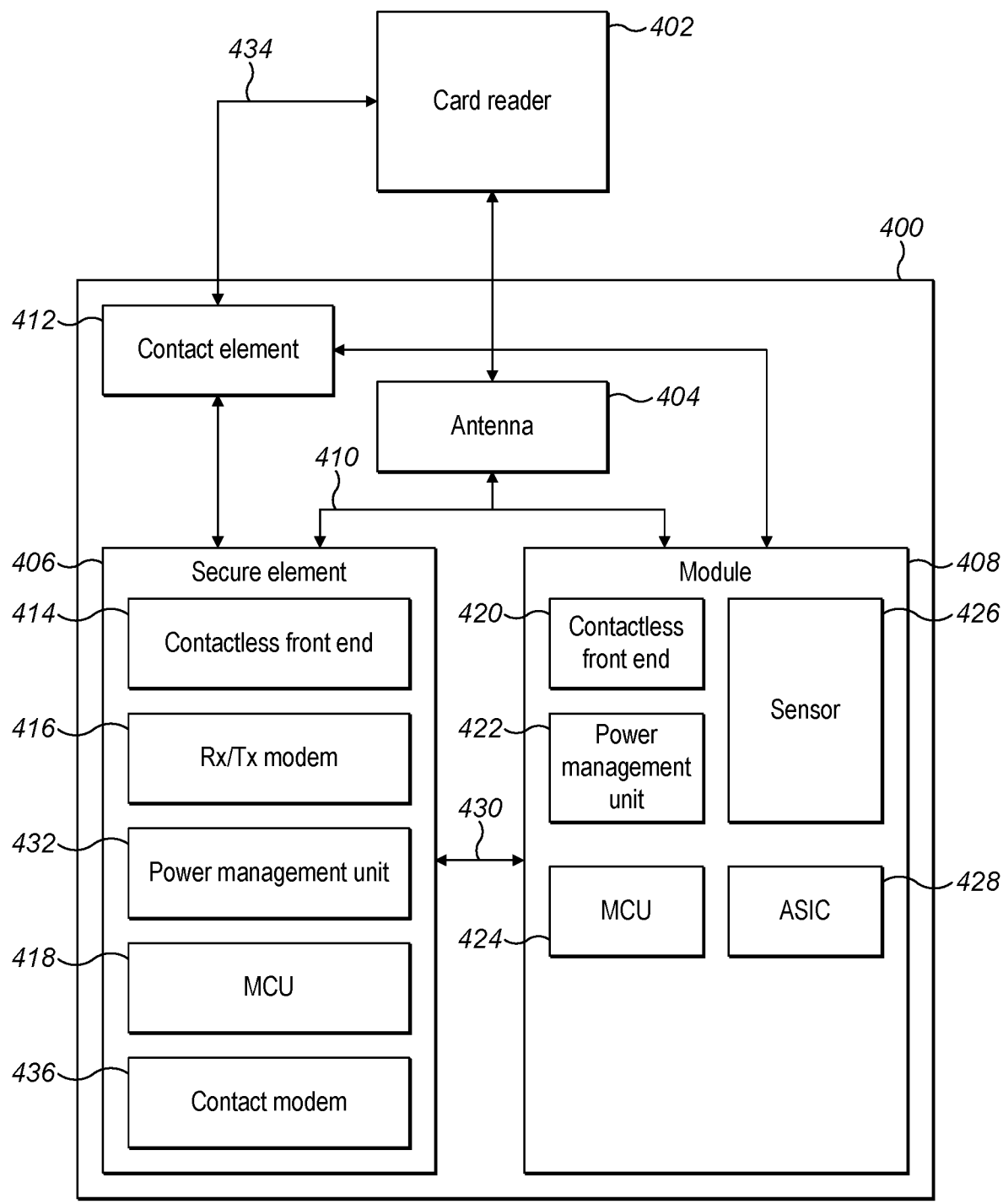
FIG. 4 shows an example implementation of a card adopting the card architecture illustrated in FIG. 3.

FIG. 4 shows a more specific implementation of a card adopting the architecture illustrated in FIG. 3.

FIG. 4 shows a card 400. The card 400 comprises an antenna 404, an embedded chip in the form of a secure element 406, and a module in the form of a biometric sensor module 408. When the card operates in contactless mode, the antenna 404 receives the wireless signal emitted by the reader 402 when the card is in sufficient proximity to the reader. In this particular example, the signal emitted by the reader is an NFC signal. Thus, the card and reader communicate in accordance with the NFC radio communication standard. Contactless communication between the card 400 and reader 402 may also comply with the ISO/IEC 14443 standard and ISO/IEC 7816 standards. In this regard, the reader 402 may be referred to as a proximity coupling device (PCD), and the card 400 may be referred to as a proximity integrated circuit card (PICC).

The secure element 406 and sensor module 408 are logically and/or physically separate components of the card 400. If physically separate, they may be not implemented on a common chip but instead implemented on separate respective chips each embedded within the card. If only logically separate, they may be implemented on a common chip. In the example shown here, they are physically separate.

The secure element 406 and sensor module 408 are interconnected by a link 430. Link 430 could be a bus, for example the inter-integrated circuit ($I^2C$) bus.

Antenna 404 is shared between the secure element 406 and the biometric sensor module 408. That is, both the secure element and the biometric sensor module are connected to the antenna. The card comprises a power line 410 that is routed from the antenna to both the secure element and the biometric sensor module to connect those components to the antenna. The power line may be a physical line, such as a conductive wire.

Card 400 also comprises one or more contact elements 412 to enable the card to communicate with the reader 402 through direct physical contact. The contact elements provide electrical connectivity to the card reader 402 when the card and reader and brought into suitable physical contact. Contact communication between the card and card reader may be governed by the ISO/IEC 7816 standard. When the card is operating in contact mode, the secure element 406 and module 408 receive power from the card reader 402 through the one or more contact elements 412 over link 434.

The secure element 406 operates to perform a first function associated with the card 400. As part of performing this function, the secure element exchanges data with the card reader. This data is exchanged through the contactless interface when the card is operating in a contactless mode, and through the contact interface when the card is operating in contact mode. The secure element comprises a contactless front end 414, a transceiver modem 416, a secure microcontroller unit (MCU) 418, a power management unit 432 and a contact modem 436. The components of the secure element may be interconnected by a bus.

The contactless front end 414 operates to harvest power from the wireless signal emitted by the reader 402 and received by the antenna 404 when the card is operating in contactless mode. The contactless front end may operate to harvest power from the received signal and output a rectified voltage to other components internal to the secure element, i.e. to the transceiver modem 416, power management unit 432 and the MCU 418. The contactless front end is an example of a power harvest unit.

The power management unit 432 manages, or controls, the power supplied to the components of the secure element that is harvested by the contactless front end or supplied through the contact element 412. In this way, the power management unit 432 can control the power consumed by the other components of the secure element. The power management unit 432 may be physically interconnected to each of the contactless front end 414; modem 416 and 436; and the MCU 418.

The transceiver modem 416 operates to extract data from a received wireless signal when the card operates in contactless mode. The reader 402 transfers data to the card 400 by modulating the signal it generates. The reader may modulate the generated signal by means of amplitude modulation. The modem may then extract data from the received wireless signal by demodulating amplitude variations of the voltage induced in the antenna caused by the amplitude modulation at the reader 402.

The modem 416 may also operate to transfer data and messages from the secure element to the card reader 402 when the card is operating in contactless mode. The modem may transfer messages to the reader by modulating data generated within the secure element onto the wireless signal emitted from the reader. To do this, the modem 416 applies a modulated load to the antenna 404. Modulating the antenna load at the card 400 varies the power drawn from the received signal in accordance with the modulation. The variations in drawn power can be detected by the reader 402 and interpreted as data communicated from the card. This process may be referred to as load modulation.

The modem 416 may also be responsible for controlling the transmission of messages from the secure element to the reader to comply with the ISO/IEC 14443 and ISO/IEC 7816 standards. The modem 416 is therefore an example of a transmission management unit.

The contact mode modem 436 operates to transfer and receive data and messages from the secure element to the card reader 402 when the card is operating in contact mode. The contact mode modem may exchange messages with the card reader 402 via the contact element 412. The contact mode modem may control the transmission of messages from the secure element to the reader to comply with the ISO/IEC 7816 standard.

The MCU 418 may operate to store data (e.g. data received from the reader 402 and/or data generated internally of the secure element or received from the sensor module 408). The MCU may also operate to perform one or more tasks (e.g. encryption and/or authentication) to implement a first and/or second function associated with the card.

The biometric sensor module 408 operates to perform processes as part of a second function associated with the card. In this example, that function is biometrically identifying or authenticating a user of the card 400. In some examples, the module 408 performs all the processes forming the biometric authentication; i.e. the module 408 performs the biometric authentication. In other examples, the processes required to perform the biometric authentication are distributed between the module 408 and the chip 406; i.e. both the chip and the secure element perform processes required to perform the biometric authentication. Examples of this will be described in more detail below.

In contrast to the secure element 406, the biometric sensor module does not exchange data with the card reader. The sensor module 408 comprises a contactless front end 420; a power management unit 422; a microcontroller unit (MCU) 424; a biometric sensor 426 and an application specific integrated circuit (ASIC) 428. The components of the sensor module 408 may be interconnected by a bus.

The contactless front end 420 operates in a similar manner to the front end 414, and harvests power from the wireless signal emitted from the card reader and received by the antenna 404 when the card operates in contactless mode. Because both the secure element 406 and the biometric sensor module 408 are connected to the antenna and include their own contactless front end, the biometric sensor module 408 is able to harvest power from wireless signals received at the antenna independently of the secure element 406.

The contactless front end 420 outputs harvested power to other components of the biometric sensor module 408. The contactless front end may operate to output a rectified voltage from power harvested from the received signal. The rectified voltage may be supplied to other internal components of the sensor module 408. In one particular arrangement, the contactless front end outputs the rectified voltage to the power management unit 422. The power management unit may be the only component of the biometric sensor module 408 that receives power from the contactless front end 420 in contactless mode.

The power management unit 422 manages, or controls, the power supplied to the components of the biometric sensor module 408. In this way, the power management unit 422 can control the power consumed by the other components of the sensor module. When the card operates in contactless mode, the power management unit 422 receives harvested power from the contactless front end 420. When the card operates in contact mode, the power management unit 422 receives power supplied from card reader 402 through the contact element 412. Thus, the power management unit may be connected to the contact element (e.g. by a conductive link).

The power management unit 422 may be physically interconnected to each of the MCU 424, sensor 426 and ASIC 428. This allows the power management unit to control the power supplied to each of these components separately. The inclusion of the power management unit 422 within the sensor module 408 also enables the sensor module to control the power consumption of each of its internal components independently of the secure element 406.

Sensor 426 is a biometric sensor for capturing images of a biometric source. Sensor 426 could be, for example, a fingerprint sensor, a retina sensor, an iris sensor, a facial sensor etc.

The ASIC 428 controls the operation of the sensor 426. The ASIC may for example instruct the sensor to enter an acquisition mode in which the sensor captures an image of a biometric source (e.g. a fingerprint, retina, iris etc.). The ASIC may also receive image data captured by the sensor 426 (e.g. during acquisition mode). The ASIC may communicate the captured image data to the MCU 424. Following capture of the image, the ASIC may also instruct the sensor to power down to a standby mode.

The MCU 424 may perform image matching to compare an image captured by the sensor 426 to a stored template image, or to stored template images. A template image is a trusted image. An image may be trusted in the sense it is taken to be of a biometric source belonging to the user of the card 400. To perform the image matching, the MCU may perform feature extraction on the captured image to identify a set of one or more extracted features. The extracted features are then compared with the features of the template image to determine if the captured image matches the template image. The MCU may for example compare the features of the images to determine a matcher score for the captured image. The captured image may be taken to match the template image if the matcher score is above a predetermined threshold.

The MCU may communicate an indication that the captured image matches the template image to the secure element 406. The secure element 406 can then communicate an indication that the user of the card has been authenticated back to the reader 402. The authentication of the card user may enable the primary function associated with the card 400 to be completed. Alternatively, the MCU may communicate to the secure element 406 that the captured image does not match the template image, in which case the user of the card has not been authenticated and primary function associated with the card 400 may not proceed, or may proceed in an altered fashion as a consequence of there being no match. This is an example of an implementation in which each stage, or process, of the biometric authentication is performed by the module 408.

In an alternative implementation, the process of performing the image matching may be performed by the MCU 418 within the secure element 406, rather than by the MCU 424. This is an example of an implementation in which the processes of biometric authentication are performed by both the secure element 406 and the module 408; i.e. the biometric authentication is not performed solely by the module 408.

Figure 5:
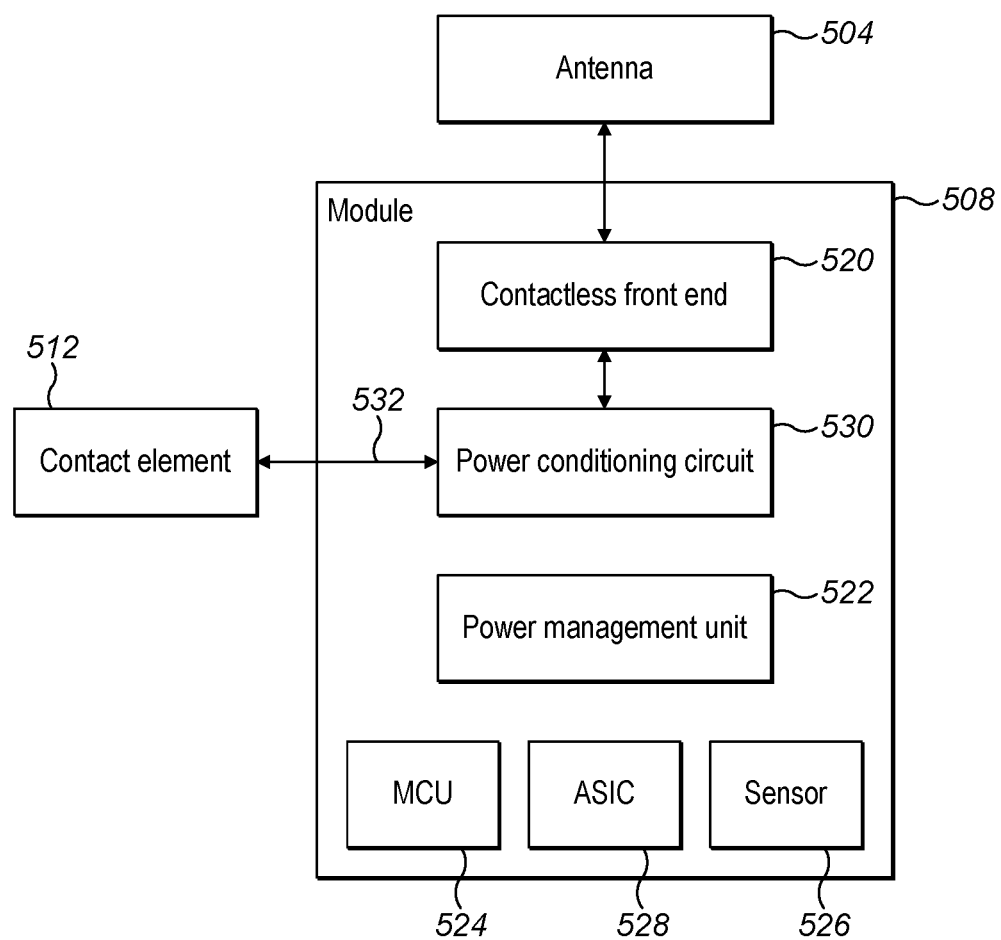
FIG. 5 shows an example of a module comprising a power-conditioning circuit.

FIG. 5 shows a further example of a module. The module 508 is shown connected to an antenna 504, and a contact element 512. The chip (e.g. secure element) has been omitted for the purposes of clarity. Module 508 could be implemented within the architectures shown in FIG. 3 or 4.

Module 508 comprises a contactless frontend (CLF) 520, a power management unit 522, an MCU 524, sensor 526 and ASIC 528. These components may operate in the same manner as the corresponding components shown in FIG. 4. The module 508 further comprises a contact power conditioning circuit 530. The power conditioning circuit is connected to the contact element 512 by link 532. Link 532 may be a conductive link.

The power conditioning circuit 530 performs two functions. Firstly, it can operate to prevent current inrush from overloading the card reader when the card is operating in contact mode. Current inrush refers to the current drawn by the card when the components of the card are powered up, e.g. when the card is inserted into the card reader in contact mode. Conventional card readers are typically only designed to power the secure element on the card, rather than a secure element plus an additional module. As a consequence, the card readers may detect a fault if an amount of current is drawn on power up that exceeds a predetermined threshold. It has been appreciated that the inclusion within the card of the module increases the current drawn on power up to power up the internal components of the module, thus increasing the risk that the drawn current will overload the card reader, causing a fault to occur. The power conditioning circuit operates to limit the current drawn by the module through the contact element during power up when the card is operating in contact mode. This will be explained in more detail below.

Secondly, the power conditioning circuit operates to isolate the contact element from power harvested in the module during contactless operation. It has been appreciated that when the module harvests power from the signal emitted from the card reader using its contactless front end, that harvested power may additionally power the contact element, causing the secure element to erroneously detect that the card is operating in its contact mode of operation.

Figure 6:
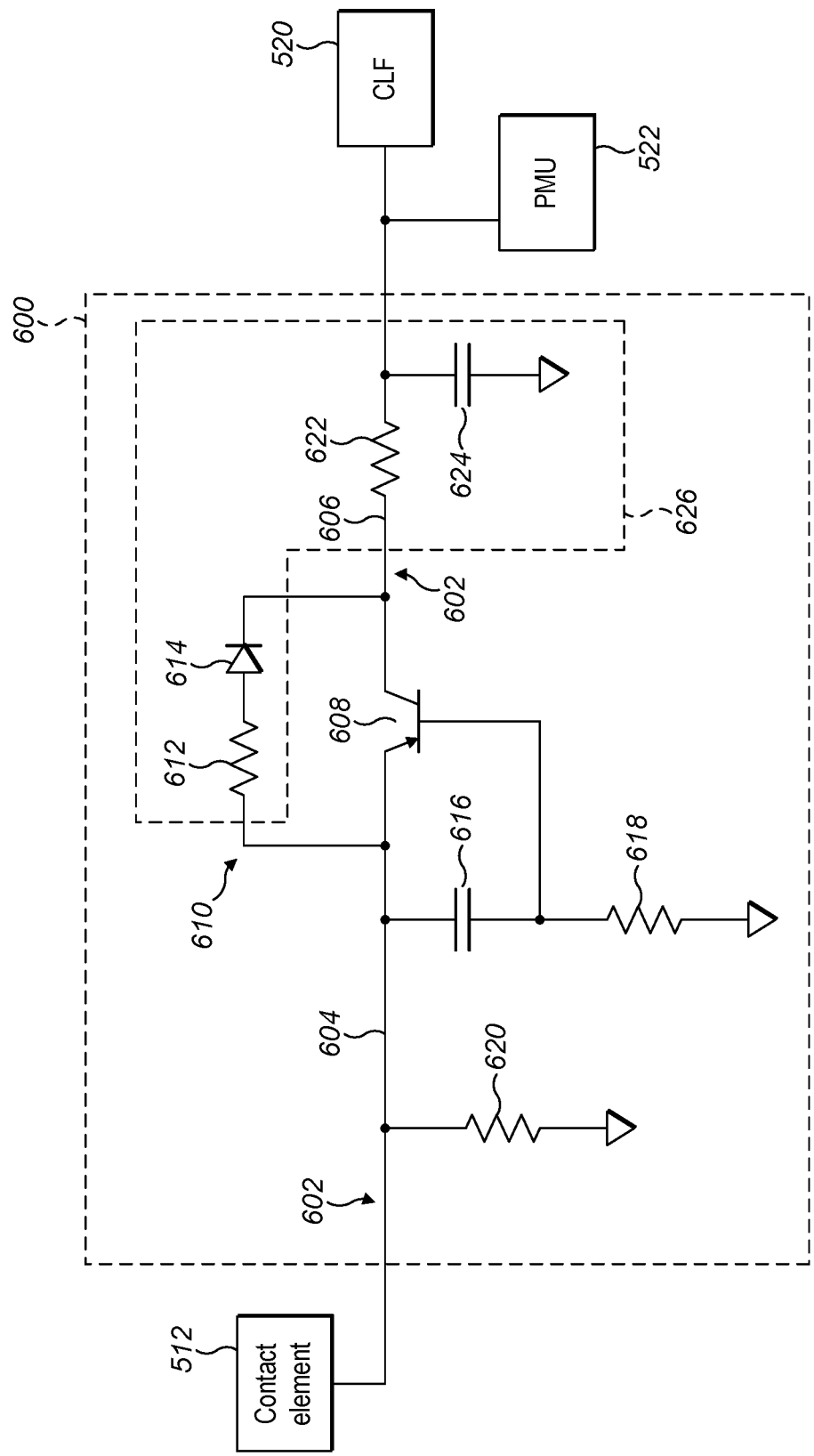
FIG. 6 shows an example of a power conditioning circuit.

An example power conditioning circuit is shown in FIG. 6. The power conditioning circuit is denoted generally at 600, and is shown connected to both the contact element 512 and the module's contactless frontend (CLF) 520. The circuit is also coupled to an internal component of the module, which in this example is the module's power management unit 522.

The circuit comprises a through-path 602 comprising a first path 604 and a second path 606 interconnected by a switching element 608. Switching element 608 is a bi-polar transistor. In particular, in this example switching element 608 is a PNP transistor that includes an emitter, a base and a collector. The emitter is electrically connected to the first path 604, and the collector is electrically connected to the second path 606. The through path 602 extends between the contact element 512 and the contactless frontend 520. Thus, the first path 604 extends between the contact element 512 and the switching element 608, and the second path extends between the switching element 608 and the contactless frontend 520. In the current example, where the switching element is a PNP transistor, the first path extends between the contact element 512 and the emitter of the PNP transistor, and the second path extends between the collector of the PNP transistor and the contactless frontend 520.

The circuit further comprises a bypass route 610 arranged in parallel to the switching element 608. The bypass route is therefore connected to both the first path 604 and the second path 606. The bypass route 610 in this example includes a resistor 612 and diode 614. In other examples it may comprise multiple resistors arranged in series. The diode 614 has a forward direction from the contact element 512 to the contactless frontend 520 (and thus a reverse direction from the contactless frontend to the contact element). The bypass route permits current to flow from the first path to the second path without passing through switching element 608 (i.e., by bypassing switching element 608).

The circuit further comprises a coupling unit 616 that couples the first path 604 to the base of the switching element. The coupling unit has a first terminal connected to the first path 604 and a second terminal coupled to the base of switching element 608, and to ground via a resistor 618. The coupling unit 616 is therefore located on the contact-element-side of the bypass route 610 and the switching element 608. In this example, the coupling unit is a capacitor. The coupling unit operates to pass time-varying current supplied from the contact element.

The circuit further comprises a resistor 620 arranged between the first path 604 and ground. The resistor 620 is arranged on the contact-element-side of the capacitor 616.

On the CLF-side of the switching element 608, there is provided a resistor 622 and capacitor 624. A first terminal of capacitor 624 is coupled to the second path 606, and the second terminal of the capacitor is connected to ground. Resistor 622 is located between the output of diode 614 and the first terminal of the capacitor 624. As will be explained in more detail below, resistors 612, 622 and capacitor 624 form a low-pass filter 626. In the current example, in which switching element 608 is a PNP transistor, the resistor 622 may also be said to be located between the collector of PNP transistor 608, and the first terminal of the capacitor 624.

It is noted that circuit 600 contains only a single switching element.

Circuit 600 can operate in a forward direction mode and a reverse direction mode. When operating in the forward direction mode, the circuit controls the flow of current from the contact element 512 to the module's PMU 522 during power-up and following power-up. That is, the circuit controls the amount of current drawn by the PMU 522 from the contact element. The circuit operates in forward direction mode to prevent current inrush from overloading the card reader when the card is operating in contact mode. When operating in reverse direction mode, the circuit controls, or isolates, the flow of current from the CLF 520 back to the contact element 512 when the card is operating in contactless mode. In other words, the circuit operates in reverse direction mode to isolate the contact element from power harvested by the module's contactless frontend. These operating modes will now be described in more detail.

When the card is operating in contact mode then, during power up (e.g. as the card is inserted into the card reader), power is supplied from the card reader through the contact element (e.g. in accordance with the ISO7816 standard). This initial supplied power pulls the first path 604 high. Coupling capacitor 616 couples the supplied power to the base of the switching element 608, pulling the base high and causing switching element 608 to be open. By driving the switching element open, then during power up power can only pass from the first circuit path 604 to the second circuit path 606 through the bypass circuit 610; in other words, the bypass circuit forms the only path between the first circuit path 604 and the second circuit path 606.

As mentioned above, resistors 612, 622 and capacitor 624 form a low-pass RC filter network. The bypass circuit 610 therefore forms part of the low-pass RC filter network. Thus, by driving switching element 608 open, current supplied from the contact element passes through the bypass circuit 610 and the low-pass filter network. The low-pass filter network operates to slow down the current inrush during power up, reducing the peak current inrush value. Thus, the circuit 600 controls the current drawn from the contact element by the PMU 552 to prevent current inrush from overloading the card reader. The amount of current drawn by the PMU during power up can be controlled by suitable resistance selection of the resistors 612 and 622, and capacitor 624.

In time, coupling capacitor 616 is charged by the contact element 512, causing the base of switching element 608 to be pulled low by resistor 618. Thus, following power-up, switching element 608 is pulled closed by resistor 618, and thus current from the contact element 512 is supplied from the first circuit path 604 to the second circuit path 606 (and consequently to the PMU 522) through the switching element 608.

The reverse mode of operation (when the card is operating in contactless mode) will now be described.

When the card is operating in contactless mode, the module's contactless frontend 520 operates to harvest power from the signal emitted from the card reader, as described above. When the card is operating in contactless mode, no power is drawn through the contact element 512. Switching element 608 is therefore open, because its base is not negatively biased with respect to the emitter. The switching element 608 and bypass circuit 610 therefore prevent current flowing from the second circuit path 606 to the first circuit path 604. In other words, during the contactless mode of operation, power harvested from the CLF 520 is isolated from the contact element 512 by: (i) the open switching element; and (ii) the bypass circuit, whose diode 614 prevents current flowing from the second circuit path 606 to the first circuit path 604.

The arrangement of circuit 600 provides several advantages.

Firstly, circuit 600 operates to both prevent current inrush from overloading the card reader when the card is operating in contact mode, and to isolate the contact element from power harvested by the module's contactless frontend during the contactless mode of operation, yet contains just a single switching element, reducing the cost and complexity of introducing the power conditioning circuit within the module. Circuit 600 can therefore be implemented with a reduced number of components compared to approaches in which separate circuits are implemented to perform current inrush prevention and contact element isolation. Reducing the component count can also reduce the cost of the circuit.

Secondly, the efficient use of components of the power conditioning circuit means the circuit can be implemented on a relatively small physical scale. This is convenient because packaging constraints on the card may be relatively high. For example, it may be desirable for the module to be as physically small as possible so as to not substantially increase the thickness and/or weight of the card.

Thirdly, the use of a single switching element which may be in the form of a PNP transistor may facilitate the provision of a power conditioning circuit suffering from only a relatively low voltage drop across it compared to other possible implementations (e.g. implementations employing multiple switching elements, or implementations using only diodes to control the directional flow of current). Reducing voltage drop enables a higher voltage to be available for other components of the module, such as the biometric sensor. This may be particularly advantageous for examples in which the biometric sensor is a capacitive fingerprint sensor, since higher levels of available voltage leads to improved signal-to-noise ratios and hence better-quality image capture. Improving the image capture can lead to improved false rejection/false acceptance rates when the device is used for biometric verification.

In summary, FIGS. 2 to 5 describe various architectures in which the card antenna is connected to a module that is logically and/or physically separate from the embedded chip that exchanges data with the reader. As explained above, data can be communicated from the card back to the reader by load modulation of the signal emitted by the reader when the card operates in contactless mode. In effect, data is modulated onto the signal emitted by the reader by varying the power drawn from the signal at the card. It has been appreciated that additional components of the card drawing current from the emitted signal (such as the module in the architecture shown in FIGS. 2 to 4) will affect the load modulation of the emitted signal, which may appear as extra noise to the reader.

The introduction of extra noise at the card reader may be problematic, particularly when communications between the card and reader are tightly regulated to comply with industry standards.

To combat the impact of the module on the load modulation when the card operates in contactless mode, the cards 200, 300, 400 may additionally comprise noise mitigation circuitry. In summary, the noise mitigation circuitry operates to store charge as the card is brought into range of the reader. Brought into range means that the card is brought into sufficient proximity of the reader for a voltage to be induced by the card antenna from the signal emitted by the reader. Subsequent current draws resulting from operation of the components within the module can then first be supplied by the noise mitigation circuitry before power is drawn from the signal received at the antenna. This reduces the impact of the module on the load modulation of the emitted signal. Though the initial charging of the noise mitigation circuitry may result in load spikes on the emitted signal, it has been appreciated that this in general is more tolerable during start-up of the card components (i.e. when the card is first brought into proximity of the card reader) because power spikes resulting from power up is expected and can be handled by appropriate start-up circuitry within the card.

Figure 7:
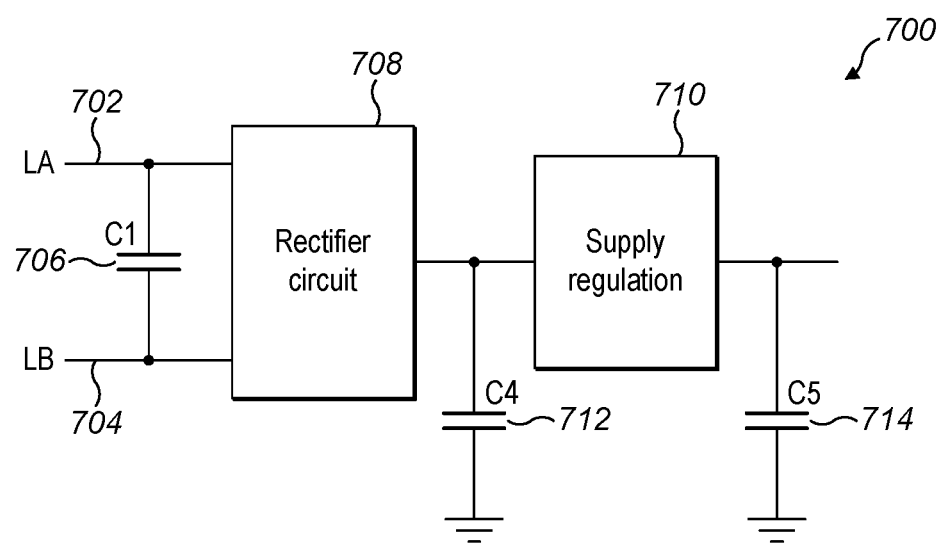
FIG. 7 shows a first example of a noise mitigation circuit to reduce noise fed back to the card reader.

FIG. 7 shows a first example of noise mitigation circuitry 700. Circuitry 700 may be included within the power harvest unit 212, power harvest unit 316, or contactless frontend 420, 520. The remaining components of those units have been omitted from FIG. 7 for clarity.

The circuitry 700 comprises first and second inputs 702 and 704 from the card antenna, and a first capacitor 706. The capacitor 706 is positioned across the two inputs 502 and 504. Capacitor 706 is a tuning capacitor that tunes the antenna (not shown) to the frequency of the signal emitted by the card reader. In some examples, the signal emitted by the card reader may be an NFC signal at a frequency of 13.56 MHz.

The circuit 700 further comprises rectifier circuitry 708 and supply regulation circuitry 710. The rectifier circuitry is coupled to the terminals of the capacitor 706. The rectifier circuity operates to rectify the voltage induced by the antenna. The supply regulation circuitry operates to output a stable, regulated voltage. It may comprise a low drop-out regulator.

The circuit 700 further comprises a plurality of charging elements configured to store charge. In this example, the charging elements are capacitors. The circuit includes two capacitors 712 and 714. Capacitor 712 is located between the rectifier circuitry and supply regulation circuitry. Capacitor 714 is coupled to the output of the supply regulation circuitry. Capacitors 712 and 714 are charged as the card is brought into range of the reader by the voltage induced by the antenna. Capacitor 712 is charged by rectifier circuitry 708, and the capacitor 714 is charged by the supply regulation circuitry 710. The capacitors 712 and 714 discharge to supply current to components of the module (e.g. the power management unit 422) in response to a current demand from those components during operation. In other words, capacitors 712 and 714 operate as energy stores that are charged as the card is brought into proximity of the reader, and then discharge to supply a peak current demand to components of the module. Thus, circuit 700 operates to prevent current demands from components of the module from modulating the load on the signal emitted by the reader, which in turn reduces the level of noise at the reader from the operation of the module. Capacitor 712 also functions as a smoothing capacitor to the rectifier circuitry 708. It may additionally function as a filter to filter out noise from reaching the antenna.

Figure 8A:
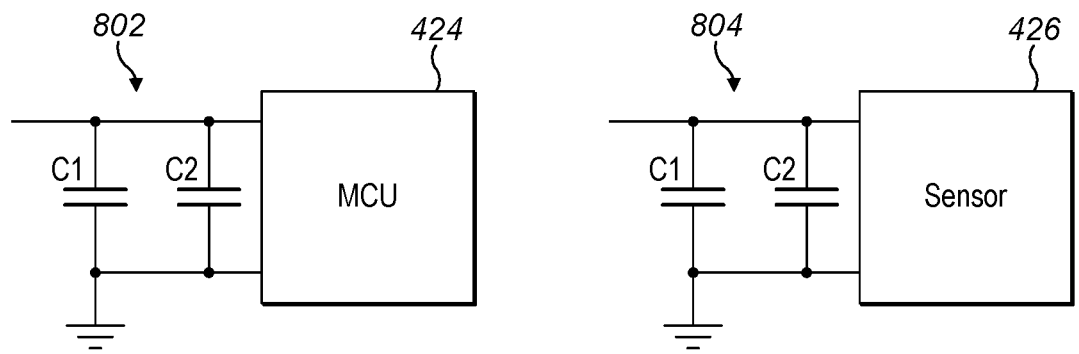
FIGS. 8A and 8B show a second example of a noise mitigation circuit to reduce noise fed back to the card reader.
Figure 8B:
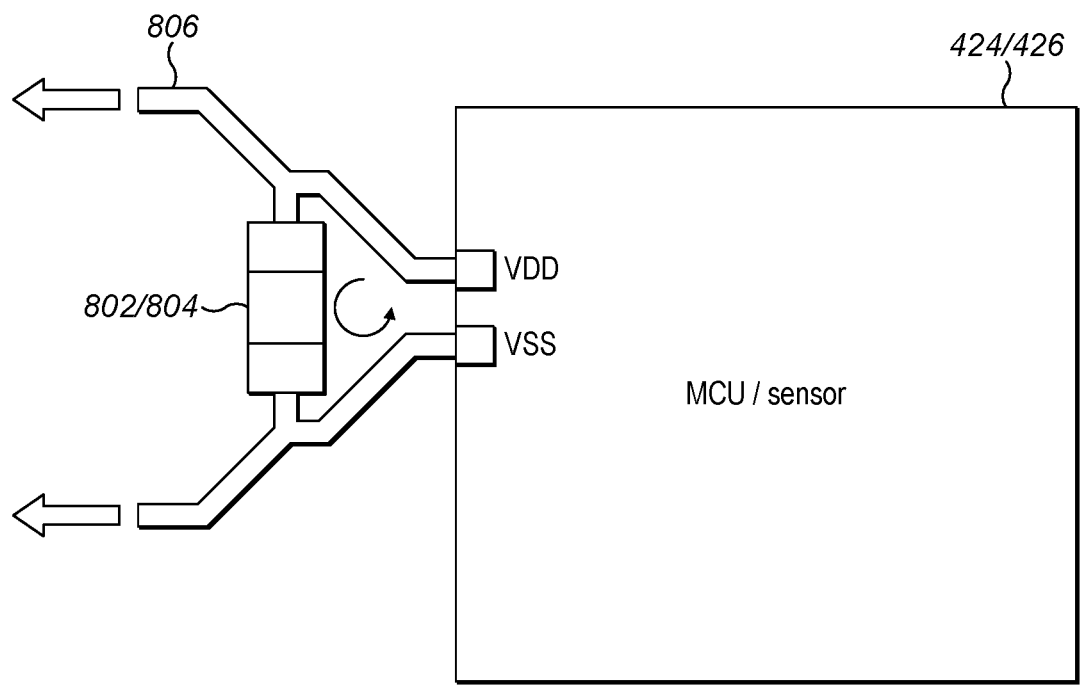

A further example of the noise mitigation circuitry is shown in FIGS. 8A and 8B.

FIG. 8A shows a local supply decoupling circuit 802 and 804 for the module's MCU 424 and sensor 426 respectively. The remaining components of the module that are connected to the MCU and sensor have been omitted for clarity.

Local supply decoupling circuits 802 and 804 each comprise a capacitor, or a plurality of capacitors arranged in parallel. In this example, each local supply decoupling circuit comprises two capacitors arranged in parallel. The capacitors are charged from the voltage induced by the antenna as the card is brought into range of the reader. In the event the module's power harvesting circuitry includes supply regulation circuit 700, the capacitors may be charged by supply regulation circuitry 710.

Subsequent current draws resulting from operation of the MCU 424 and sensor 426 can then first be supplied by the local supply circuits 802 and 804. If the power harvesting circuitry additionally includes supply regulation circuit 700, current can then be drawn from capacitors 714 and 712 after being drawn from the local supply circuits 802 and 804. In other words, current draws by the MCU 424 and sensor 426 can be supplied in the following order: 1) initially from local supply circuits 802 and 804 respectively; 2) thereafter, from the capacitor 714 of the regulation circuit 700; and 3) thereafter, from the capacitor 712 of the regulation circuit 700. This sequential supply of demanded current conveniently reduces the load modulation on the signal emitted by the reader.

The routing of the capacitors in supply circuits 802, 804 is illustrated in FIG. 8B. The interconnect circuitry connecting the MCU/sensor to the power management unit 422 is shown at 806. It is noted that for simplicity, a single block representing either the MCU or sensor is illustrated in FIG. 8B. Equivalent interconnect circuitry will connect both the MCU and sensor to the power management unit.

It can be seen that the interconnect circuitry defines two supply rails VDD and VSS to the MCU/sensor. Supply rail VSS is input into a first terminal end of the local decoupling circuit, and supply rail VDD is input into a second terminal end of the local decoupling circuit. The two supply rails and local decoupling circuits therefore form a closed circuit with the MCU/sensor. This closed circuit enables current demanded from the MCU/sensor to be supplied by the local supply circuit whilst reducing the current supplied by the power management unit 414.

The capacitors of each local decoupling circuit also operate to filter noise bands generated from the sensor/MCU. If each local decoupling circuit includes multiple capacitors arranged in parallel, each capacitor may have a different capacitance to filter out different respective noise bands.

Figure 9:
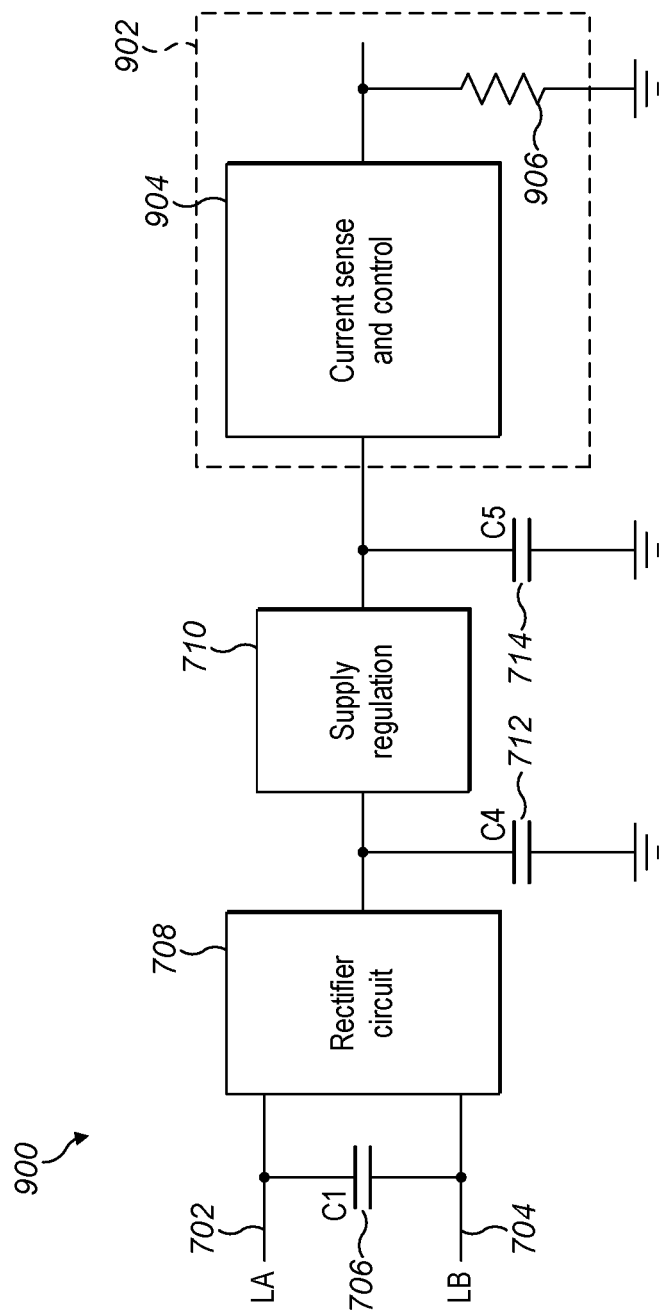
FIG. 9 shows a third example of a noise mitigation circuit to reduce noise fed back to the card reader.

FIG. 9 shows a further example of a noise mitigation circuit 900. Noise mitigation circuit 900 operates to maintain an approximately constant current load on the antenna. That is, the circuit operates to counteract deviations in current load seen at the antenna plane. In contrast to the circuits shown in FIGS. 7 and 8, which may be more suitable for relatively large current spikes, the circuit shown in FIG. 9 may be more suitable for more slowly varying current loads.

Circuitry 900 may be may be included within the power harvest unit 212, power harvest unit 316, or contactless front end 420, 520. The remaining components of those components have been omitted from FIG. 9 for clarity.

The circuitry 900 comprises first and second inputs 702 and 704 from the card antenna, and a first capacitor 706 as described above with reference to FIG. 7. The circuit further comprises rectifier circuit 708 and supply regulation circuit 710 as described above with reference to FIG. 7. The circuit additionally comprises control circuitry 902.

Control circuit 902 comprises a current sense and control block 904, and a variable load 906, e.g. a resistor. The current sense and control block 904 detects deviations in current demanded by other components of the module (e.g. the power management unit 422). The block 904 then controls the current supplied from the supply regulation circuit 710 and capacitor 714 in dependence on measured deviations of demanded current. The block 904 does this by suitable control of the resistance of variable load 906. Thus, the circuit 900 supplies a variable level of current to the other components of the module in response to deviations in demanded current so as to present a constant current demand to the antenna. This reduces the level of noise fed back to the reader.

Figure 10:
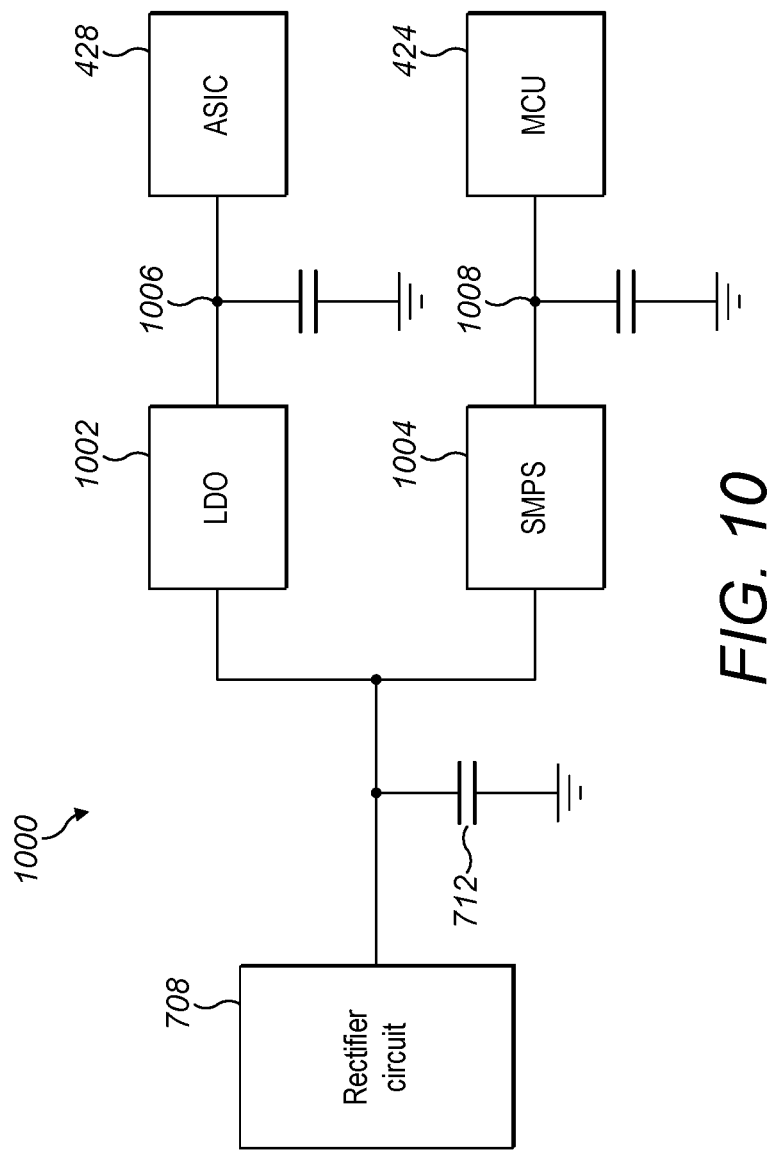
FIG. 10 shows a fourth example of a noise mitigation circuit to reduce noise fed back to the card reader.

FIG. 10 shows a further example of noise mitigation circuitry 1000 implemented as part of an alternative power management architecture. In this example, the supply regulation block 710 shown in FIGS. 7 and 9 has been replaced with a first and second type of voltage regulator each connected to a respective component of the module (which, for the purposes of illustration, is taken as module 408). The circuit comprises a first branch and a second branch each connected to a common node that is coupled to the rectifier circuit 708. The first branch comprises a first type of voltage regulator coupled to a first component of the module, and the second branch comprises a second type of voltage regulator coupled to a second component of the module. In this example, the first type of voltage regulator is a low dropout regulator (LDO) 1002, and the second type of voltage regulator is a switch-mode-power-supply (SMPS) 1004. The LDO 1002 is coupled to the module's ASIC 428, and the SMPS 1004 is coupled to the module's MCU 424.

The circuit 1000 further comprises a first charging element 1006 located between the LDO 1002 and the ASIC 428, and a second charging element 1008 between the SMPS 1004 and the MCU 424. The charging elements in this example are capacitors.

The two voltage regulators 1002 and 1004 operate to output different regulated voltage levels from each other. In one particular implementation found to be convenient for a smartcard application, the voltage regulator 1002 may output a regulated voltage of approximately 2.5V, and the voltage regulator 1004 may output a regulated voltage of approximately 1.8V; i.e., the first type of voltage regulator outputs a higher regulated voltage than the second type of voltage regulator. These different levels of regulated voltage enable different current levels to be supplied to the two components 424 and 428. This is convenient because it has been appreciated that the processing speed of the MCU 424 is a function of supplied current. By increasing the current supplied to the MCU 424, its processing speed can be increased. A numerical illustration of how circuit 1000 achieves this will now be described.

An equal wattage is supplied to both branches of the circuit from the rectifier circuit 708. As mentioned, the LDO 1002 in this example regulates the voltage to 2.5V. A typical example of the current in this case is taken to be 10 mA, for the purpose of illustration. This gives a value of 25 mW supplied by the LDO 1002. The SMPS 1004 is known to have a typical efficiency rating of around 90% compared to the LDO. Thus, the wattage supplied to the MCU 424 (on the assumption that equal wattage is supplied to both the LDO 1002 and SMPS 1004 from the rectifier circuit) is equal to 25 mW×90%=22.5 mW. If the SMPS regulates the output voltage to 1.8V, this gives a current value along the second branch of 12.5 mA. That is, the current along the second branch of circuit 1000 is higher than the current along the first branch of circuit 1000 due to the lower regulated voltage.

Calculations by the inventors have found that, for a supplied current of 10 mA, the MCU 424 can operate with a clock speed of approximately 60 MHz. However, for a supplied current of 12.5 mA, the MCU 424 can operate with a clock speed of approximately 75 MHz, which would result in approximately a 20% reduction in execution time.

Thus, compared to the circuit 700 of FIG. 7, the circuit of FIG. 10 enables the current supplied to the MCU 424 to be increased (with a consequential enhancement of processing speed), whilst still enabling the module's ASIC 428 to receive the higher output regulated voltage from the LDO 1002 (which may be needed to maintain optimal performance of the ASIC).

Examples have been described herein in which the device is a smart card. It will be understood that the term 'card' does not imply any constraints with regards to its size, shape, thickness or function. The cards described herein could for example be a plastic card such as a banking card, or ID card. It will also be understood that each example described herein could be implemented within a device adopting a different form factor that is not a card, for example a fob, a dongle or a security token (e.g. a USB token). Alternatively, the devices described herein could be integrated into a communication device such as a mobile phone or smartphone; a wearable device, such as a bracelet, watch, a glove/pair of gloves, a pin (e.g. a brooch), a badge or some other contactless wearable device.

Some cards described herein have been referred to as contactless cards. It will be understood that a contactless card, as described herein, refers to a card that can communicate with a reader through a contactless interface. However, each card described as a contactless card may also be capable of communication with a terminal through direct physical contact. Thus, the term 'contactless' has not been used herein to exclude the possibility of contact functionality.

In the examples given above the term power may be understood to refer to any relevant feature of energy availability. Examples include available energy, voltage, current and power or any combination thereof.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A device for contact and contactless communication with a terminal, the device comprising:
   an antenna for receiving a wireless signal emitted by the terminal;
   one or more contact elements connected to the embedded chip and the module and arranged to supply power to the embedded chip and the module from the terminal when the device is in contact communication with the terminal;
   an embedded chip configured to generate data for communication to the terminal to perform a first function associated with the device; and
   a module separate from the chip configured to perform processes as part of a second function associated with the device, the module being connected to the antenna and comprising a power-harvesting unit configured to harvest power from the received wireless signal to power at least the module;
   wherein the module comprises a power conditioning circuit coupled to the one or more contact elements at a first end and the power-harvesting unit at a second end, the power conditioning circuit comprising a switching element configured to limit the flow of current from the first end of the power conditioning circuit to the second end of the power conditioning circuit when the device is in contact communication with the terminal.

2. A device as claimed in claim 1, wherein the switching element is further configured to prevent current flow from the second end of the power conditioning circuit to the first end of the power conditioning circuit when the device is in contactless communication with the terminal.

3. A device as claimed in claim 1, wherein the power conditioning circuit comprises:
   a circuit path extending between the first end of the power conditioning circuit and the second end of the power conditioning circuit, the switching element interconnecting a first part of the circuit path comprising the first end and a second part of the circuit path comprising the second end;
   a bypass circuit providing a path that bypasses the switching element, the bypass circuit permitting current to flow in a direction from the first end to the second end of the circuit; and
   a coupling unit coupled to the first part of the circuit path and the switching element.

4. A device as claimed in claim 3 wherein the power conditioning circuit is arranged so that, when the device is in contact communication with the terminal, power supplied through the contact elements drives the switching element via the coupling unit to an open configuration thereby limiting current to flow from the first end of the power conditioning circuit to the second end of the power conditioning circuit through the bypass circuit.

5. A device as claimed in claim 3 wherein, when the device is in contactless communication with the terminal, power harvested by the power-harvesting unit causes the switching element to adopt an open configuration thereby preventing current flow from the second end of the power conditioning circuit to the first end of the power conditioning circuit.

6. A device as claimed in claim 3, wherein the bypass circuit comprises a diode that limits current flow to the direction from the first part of the power conditioning circuit to the second part of the power conditioning circuit.

7. A device as claimed in claim 3, wherein the power conditioning circuit contains only a single switching element.

8. A device as claimed in claim 3, wherein the switching element is a bi-polar transistor.

9. A device as claimed in claim 8, wherein the bi-polar transistor is a PNP-transistor, with the emitter of the transistor being electrically connected to the first part of the circuit path, and the collector being electrically connected to the second part of the circuit path.

10. A device as claimed in claim 3, wherein the power conditioning circuit further comprises a low-pass filter, the bypass circuit forming part of the low-pass filter thereby limiting current to flow from the first end to the second end of the circuit through the low-pass filter when the device is in contact communication with the terminal and the switching element is in an open configuration.

11. A device as claimed in claim 10, wherein the low-pass filter comprises a resistor and a capacitor, the resistor being located between a component of the bypass circuit and a first terminal of the capacitor, the capacitor comprising a first terminal that is coupled to the second path and a second terminal that is connected to ground.

12. A device as claimed in claim 3, wherein the coupling unit is a capacitor that operates to pass time-varying current supplied from the one or more contact elements to at least the power-harvesting unit.

13. A device as claimed in claim 1, wherein the power conditioning circuit is further coupled to at least one other internal component of the module at its second end.

14. A device as claimed in claim 1, wherein the chip is connected to the antenna and comprises a power-harvesting unit configured to harvest power from the received wireless signal to power the chip.

15. A device as claimed in claim 14, wherein the module is configured to harvest power from the received wireless signal independently of the chip.

16. A device as claimed in claim 14, wherein the device is configured so that only the chip is arranged to manage transmission and reception of messages with the terminal.

17. A device as claimed in claim 14, wherein the device is configured so that only the chip is adapted to communicate messages with the terminal via the antenna.

18. A device as claimed in claim 1, wherein the module further comprises noise mitigation circuitry configured to use power harvested from the received wireless signal as the device is brought into range of the terminal to store charge, and to supply current demanded from one or more components of the module to inhibit current being drawn from the antenna during operation of those components.

19. A device as claimed in claim 1, wherein the chip is a secure element.

20. A device as claimed in claim 1, wherein the module is a biometric sensor module and the second function is a biometric authentication or enrolment of a user.

* * * * *